March 21, 1933. E. A. FORD 1,902,021
SLICING MACHINE
Filed Dec. 30, 1927 5 Sheets-Sheet 1

Inventor
Eugene A. Ford
By his Attorney
W. M. Wilson

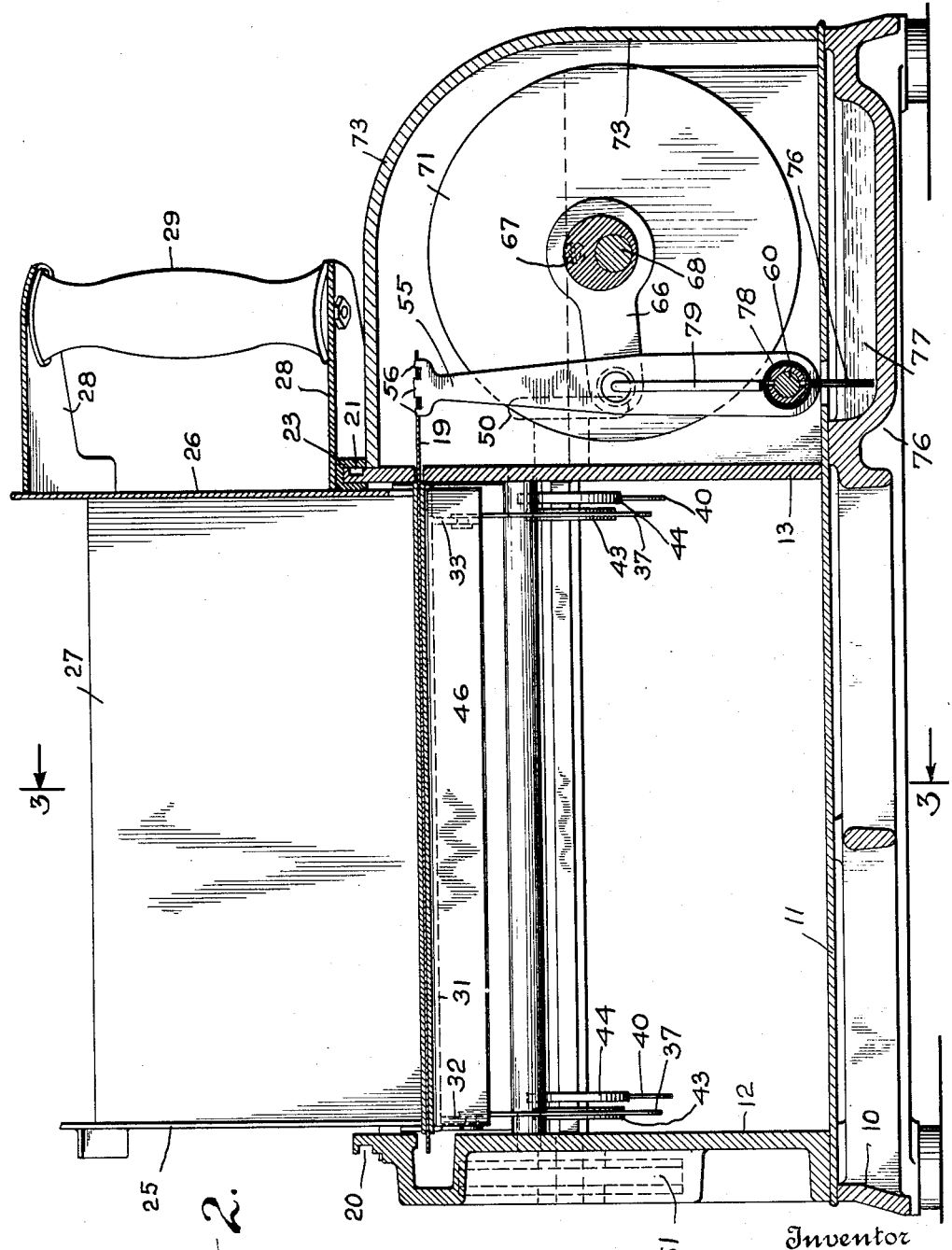

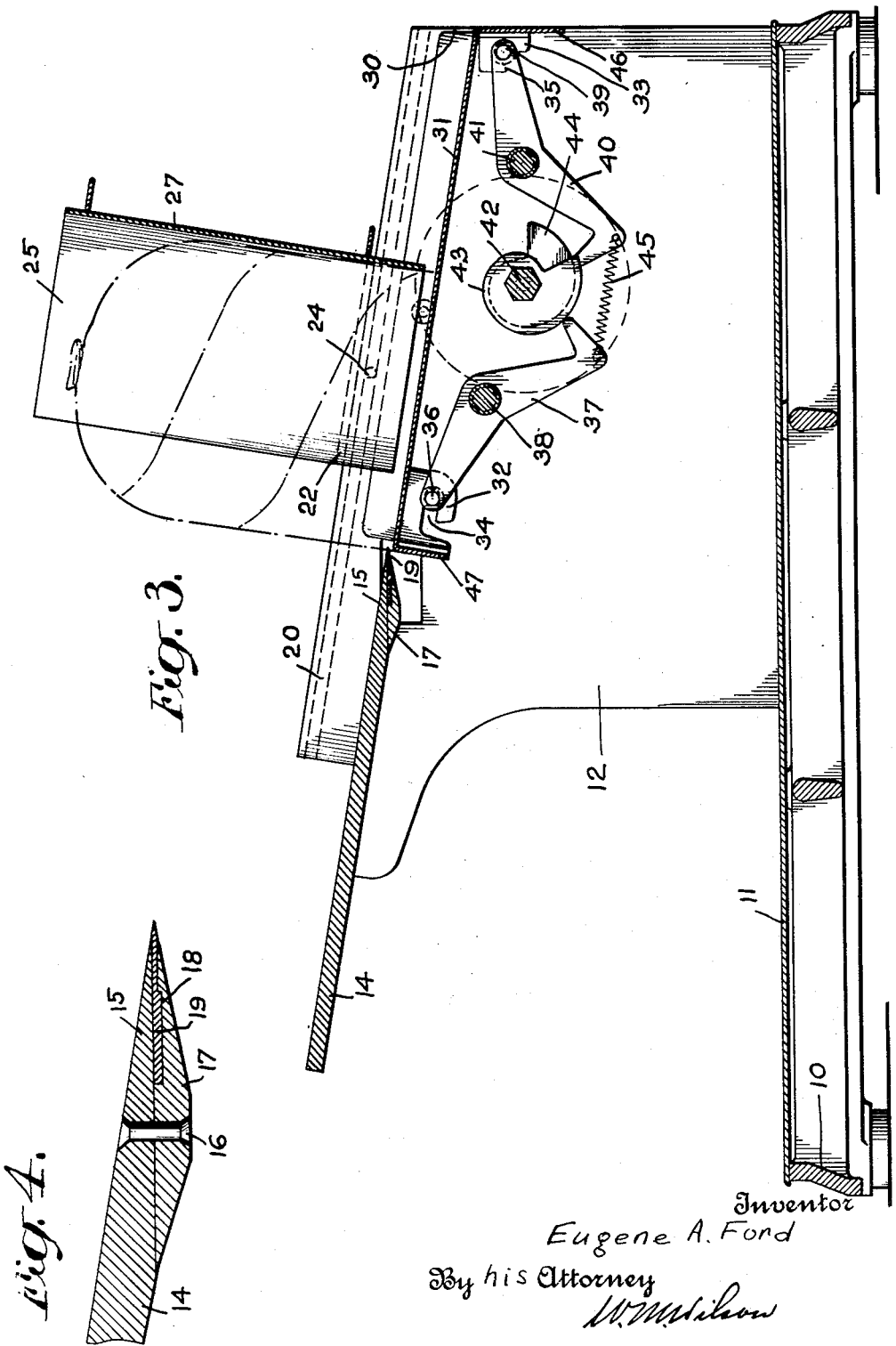

March 21, 1933.  E. A. FORD  1,902,021
SLICING MACHINE
Filed Dec. 30, 1927   5 Sheets-Sheet 4
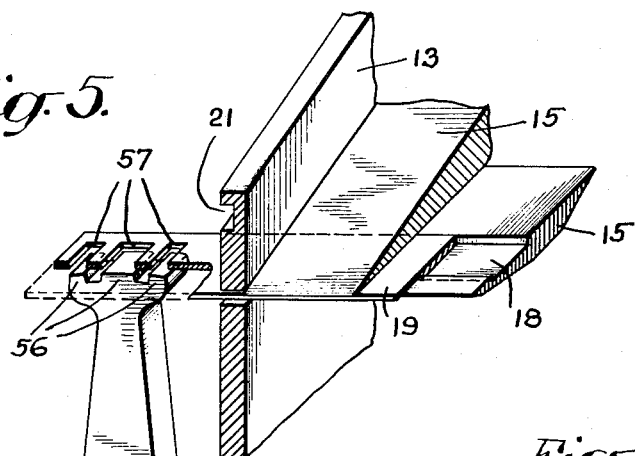
Fig. 5.
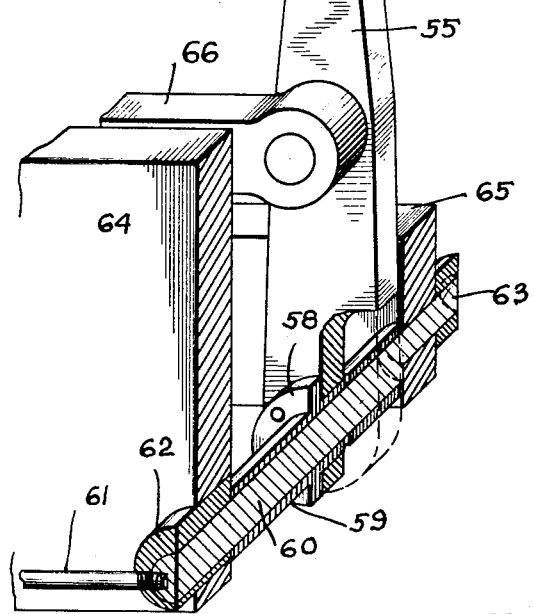
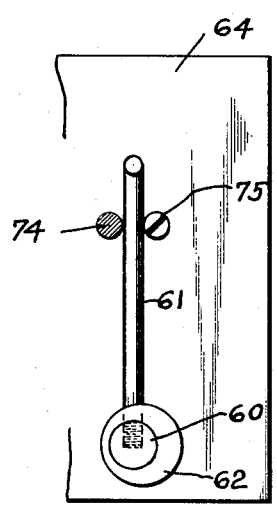
Fig. 6.
Inventor
Eugene A. Ford
By his Attorney

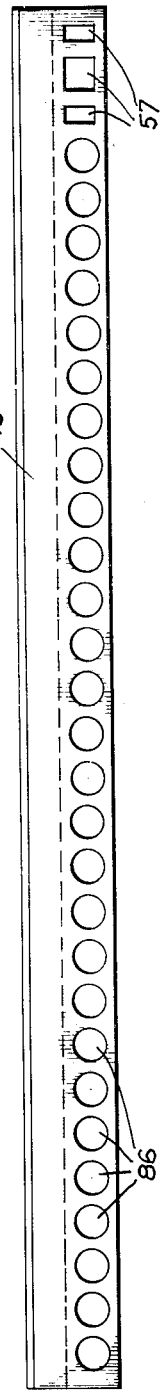
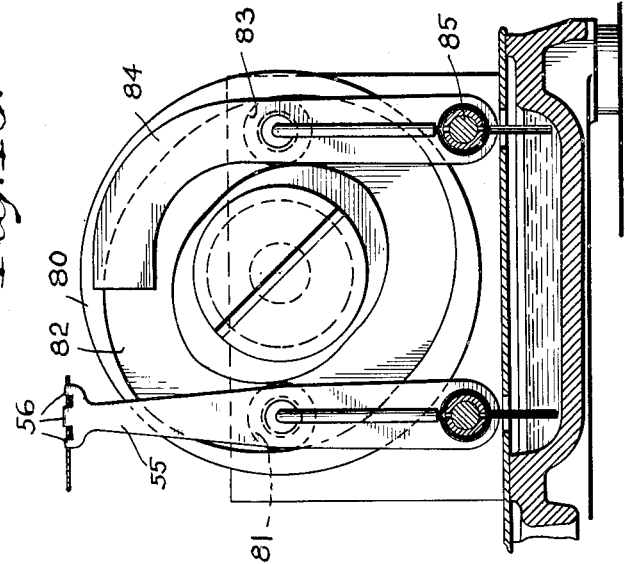
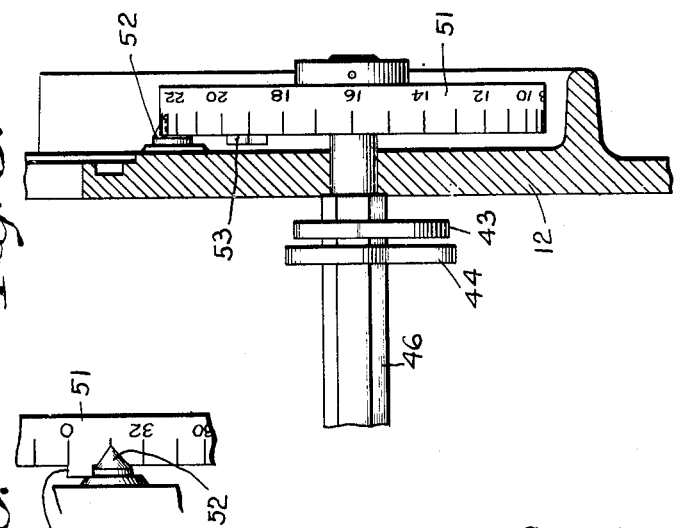

Patented Mar. 21, 1933                                                1,902,021

UNITED STATES PATENT OFFICE

EUGENE A. FORD, OF SCARSDALE, NEW YORK, ASSIGNOR TO DAYTON SCALE COMPANY, OF DAYTON, OHIO, A CORPORATION OF NEW JERSEY

SLICING MACHINE

Application filed December 30, 1927. Serial No. 243,496.

This invention relates to slicing machines, particularly food slicing machines.

The object of this invention is the provision of a novel and efficient slicing machine which may be inexpensively made and easily operated.

In particular, the object of this invention is the provision of an oscillating knife for slicing an article.

Another object is the provision of a simple feeding means for an article.

Still another object is the provision of a novel adjustment to determine the thickness of the slice cut by the knife.

The object is still further to provide a novel arrangement of parts for supporting the article and the knife.

Various other objects and advantages of my invention will be obvious from the following particular description of one form of mechanism embodying the invention or from an inspection of the accompanying drawings, and the invention also constitutes certain new and novel features of construction and combination of parts hereinafter set forth and claimed.

Fig. 2 is a section on line 2—2 of Fig. 1;

Fig. 3 is a section on line 3—3 of Fig. 2;

Fig. 4 is a detail of the knife guiding plates;

Fig. 5 is a detail of part of the knife reciprocating means;

Fig. 6 is a detail of the adjusting means for the pivot of the actuating arm of the knife;

Fig. 7 is a detail of the knife;

Figs. 8 and 9 are details of the means for indicating the thickness of slice which the knife is to cut;

Fig. 10 is a modification of the means for reciprocating the knife.

Figure 1:
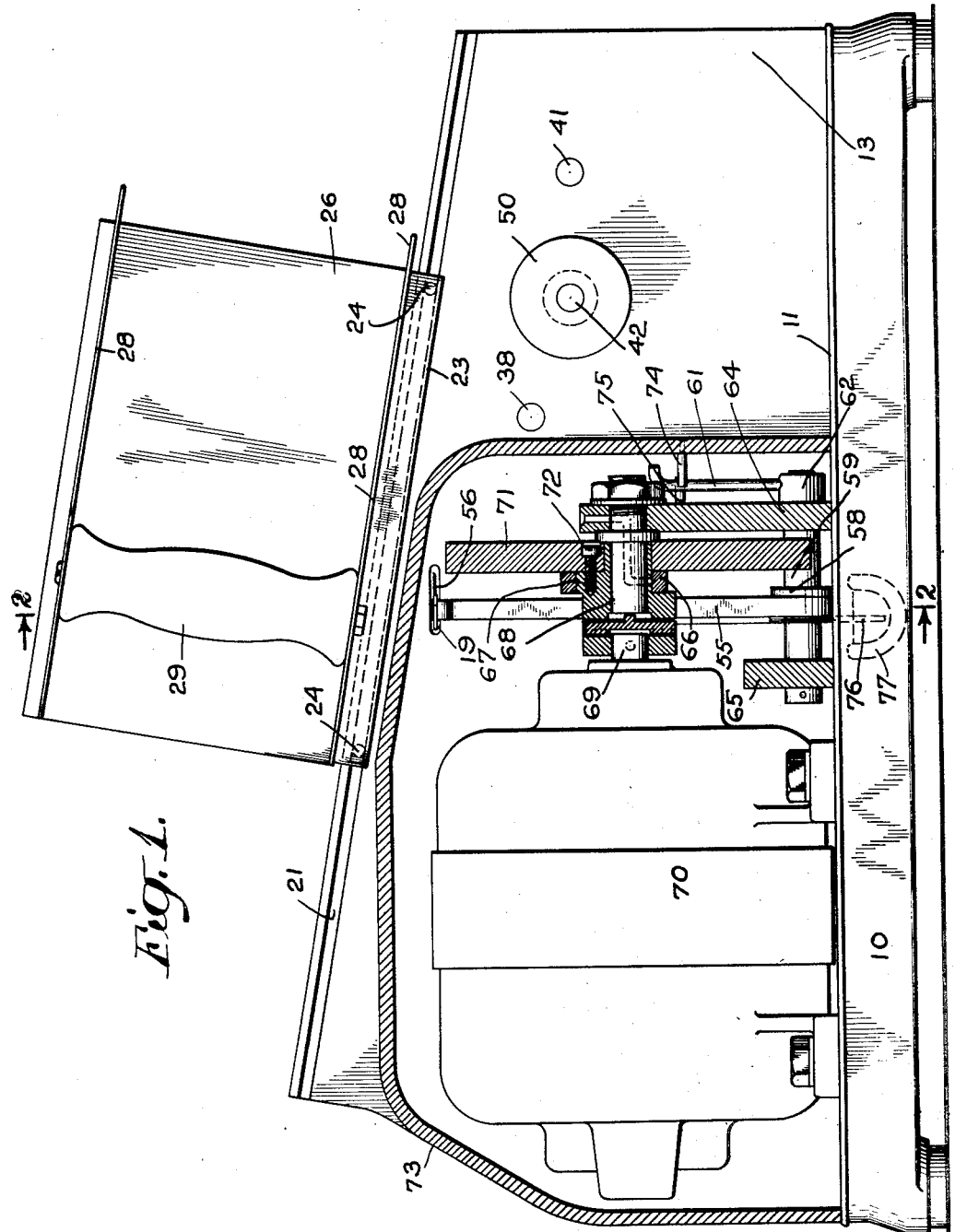
Fig. 1 is a side view of the slicing machine with the motor housing in section to show the parts enclosed therein.

Referring to the drawings in detail, the meat cutter comprises a base 10 having a supporting plate 11 on which is mounted a main frame consisting of a pair of spaced vertical parallel plates 12 and 13 and a slightly inclined plate 14 integrally joining plates 12 and 13 at one end thereof. The outer or higher end of plate 14 extends beyond plate 12 as shown in Fig. 3 and terminates coincidently with plate 13 as shown in Fig. 1 while its inner or lower end terminates in a reduced portion 15, the under side of which is substantially horizontal. It is understood that this particular construction and arrangement is not absolutely necessary but is preferred for convenience. Fixed to portion 15 by a rivet 16 is a plate 17, the upper surface of which at the rear is formed flat and fits against the flat under surface of portion 15 (see Fig. 4). The forward end of plate 17 has its upper surface spaced from the under surface of portion 15 and is provided with a guide slot 18, the bottom of which is parallel to the under surface of portion 15. Guide slot 18 serves to guide a knife blade 19 for slidable movement between portion 15 and plate 17, the forward or cutting edge of the knife extending beyond the edges of plate 17 and portion 15.

The upper edges of vertical frame plates 12 and 13 extend higher above the base plate than plate 14 and are inclined parallel to plate 14. Slightly below said edges and parallel therewith the plates are formed on their outer sides with grooves 20 and 21, respectively. Inverted U-shaped blocks 22 and 23 fit over the upper edges of plates 12 and 13 respectively, block 23 being longer than block 22. Block 23 is provided with two pins 24, one at each end, which ride within groove 21 (Fig. 1). Block 22 has only one pin 24 at its center riding in groove 20 (Fig. 3). The pins in cooperation with the guide slots 20 and 21 serve to retain the blocks for sliding motion along the upper edges of plates 12 and 13. Rigidly attached to blocks 22 and 23 respectively are the short and long parallel side walls 25 and 26 of a three-sided feeding frame, the third side of the frame being the rear wall 27 which joins the two side walls. The feeding frame is open at the front and at the top and bottom. The long side 26 has a pair of upper and lower plates 28 extending outwardly between which is mounted a handle 29 by means of which the feeding frame may be moved back and forth along the upper edges of the plates 12 and 13, being guided thereon by blocks 22 and 23. The lower edges of the feeding frame are parallel to and slightly above the plane of the upper surface of the plate 15 so that the frame may be moved over the plate 15 during its forward stroke and if desired may be removed from the machine entirely by sliding it out of grooves 20 and 21 during the forward stroke. The rearward stroke of the feeding frame is limited by contact of the rear wall 27 thereof with transverse projection 30 at the rear of the frame plates 12 and 13 (see Fig. 3).

Positioned towards the rear of the main frame and below the feeding frame is a plate 31 each end of which has a pair of lugs 32 and 33, provided respectively with guide slots 34 and 35. Slidably guided in slots 34 are pins 36 of a pair of levers 37 journalled intermediately on a rod 38 carried by and between the vertical frame plates 12 and 13. Guided in the slots 35 are pins 39 of a pair of levers 40 journalled intermediately on a rod 41 parallel to the rod 38 but lower down and similarly atached to the main frame. Between rods 38 and 41 and parallel thereto is a polygonal shaped rod 42 journalled at its ends in the vertical frame plates. The rod 42 is provided with a pair of cams 43 and a pair of cams 44 each end of rod 42 being provided with one of each pair. Cams 43 coact with the lower ends of levers 37 and cams 44 coact with levers 40. The cams 43 and 44 are similar in contour but the latter is smaller than the former which results, in conjunction with the fact that rod 41 is lower than rod 38, in the end of plate 31 supported by levers 40 extending lower than the end of the plate supported by levers 37, the plate being held by the levers parallel to the inclined upper edges of plates 12 and 13. It is understood that the same effect may be had by making levers 40 smaller than levers 37 but the arrangement preferred is more convenient. The levers 37 and 40 are held in contact with the cams by means of springs 45 joining the adjacent levers 37 and 40. Projecting downwardly from the rear or lower end of the plate 31 is an integral piece 46 which serves as a guard for levers 40 and the adjacent mechanism. The forward or higher end of plate 31 is provided with an integral right angular downward extension 47. The cutting edge of knife 19 is higher than the top of plate 31 and is spaced from the upper edge of extension 47. The height of the cutting edge above the top of plate 31 determines the thickness of cut of an article supported on said plate. The relative position of plate 31 and the knife may be varied at will by rotating shaft 42. The cams carried by said shaft are approximately spirally shaped so that their radius vectors are of gradually increasing length. The levers 37 and 40 being forced by spring 45 to follow the cams, the plate 31 supported by said levers will be moved up or down in accordance with the position of the end of levers 37 and 40 on their respective cams 43 and 44. The shaft 42 is rotated by a hand wheel 50 (Figs. 1 and 2) carried by the shaft on the outer side of frame plate 13. The other end of the shaft has fixed thereto an indicating wheel 51 carried by the shaft outside of plate 12. The wheel has numbers marked thereon which cooperate with an index pin 52 to indicate the height to which plate 31 has been adjusted relative to the knife blade 19. The back of wheel 51 is provided with a lug 53 adapted to contact with the sides of index pin 52 to limit rotation of the wheel in either direction. By rotating the shaft 42 through hand wheel 50, plate 31 may be raised or lowered and adjusted relative to the knife in accordance with the indications on wheel 51.

The knife 19 is given a rapid reciprocating motion in guide slot 18 by means of an oscillating arm 55, to the right of vertical plate 13 connected to the knife by a plurality of rectangular prongs or fingers 56 at the upper end of the arm fitting in similarly shaped openings 57 in the right hand end of the knife blade (as viewed in Fig. 2 or 7). At its lower end, arm 55 is fixed to the side of a collar 58 integral with a sleeve 59 rotatably mounted on a shaft 60 which is fixed at one end by a long screw 61 relative to an eccentric bearing 62 and at its other end terminates in a reduced bearing portion 63 the center of rotation of which is coincident with the center of rotation of eccentric bearing 62. Bearing 62 and bearing portion 63 are rotatably mounted in standards 64 and 65 supported on base plate 11.

Pivoted intermediately to the arm 55 is one end of a connecting arm 66 freely encircling at the other end an eccentric 67 fixed to a shaft 68 for rotation therewith. The shaft 68 is coupled to the shaft 69 of a motor 70 supported on the base plate. The outer end of shaft 68 is journalled in the upper end of standard 64. A flywheel 71 is fixed by a screw 72 to the eccentric sleeve 67. Upon operation of the motor, eccentric sleeve 67 through arm 66 imparts an oscillating motion to arm 55 about shaft 60. The oscillation of arm 55 in turn rapidly reciprocates the knife 19 between plate 17 and portion 15 of plate 14.

The entire driving mechanism for the knife is enclosed by a housing 73 supported on the base plate 11 at the outer side of fixed frame plate 13.

In order to disconnect arm 55 from knife 19 for cleaning purposes or otherwise, the arm is lowered to remove prongs 56 from holes 57 in the knife. The housing 73 has fixed therein a pin 74 (see Fig. 1) which when the housing is in normal position prevents the movement of screw 61 to the left from the position shown in Fig. 6 to the position shown in Fig. 5. A screw 75 fastened in the standard 64 prevents movement of screw 61 to the right from the position shown in Fig. 6. Hence when the housing is in place the screw 61 is held fixed in the position shown in Figs. 1 and 6. The eccentric bearing 62 and shaft 60 to both of which the screw 61 is fastened are thus maintained in position to keep arm 55 in its raised position where its prongs enter the holes 57 of the knife. When the housing 73 is removed, the pin 74 thereon is no longer in the path of the screw 61 and the latter may then be grasped and moved to the left to the position shown in Fig. 5. The eccentric bearing 62 and shaft 60 are thereby rotated so as to lower the arm 55 and remove the prongs thereon from the knife.

Shaft 60 is oiled by means of a tube 76 drawing oil by capillary action from a trough 77 formed in the base 10. The tube 76 is fixed in a sleeve 78 (Figs. 2 and 5) from which also extends upwardly a second tube 79 (Fig. 2) the upper end of which discharges oil around the pin connecting arms 55 and 66. The oiling device herein described is only one example of any number of equivalent oiling devices which may be used with equal facility.

In Fig. 10 is shown a modification of the means for oscillating arm 55 from motor 70. In this case, the motor shaft is coupled to a box cam wheel 80 and arm 55 is provided with a cam roller 81 following cam slot 82. As the cam wheel rotates, the arm 55 is oscillated by the eccentric wheel 80 through the cam slot 82 and the cooperating roller 81. Diametrically opposite cam roller 81 is a second cam roller 83 provided on an arm 84 pivoted to the frame on a shaft 85. The arm 84 acts as a counterbalance to arm 55.

In the operation of the slicing machine, the article to be sliced such as a loaf of bread, meat, or other provision (shown for example in Fig. 3 as a piece of bologna) is placed in the feeding frame against wall 27 thereof and rests on the adjustable plate 31. The shaft 42 is then rotated by hand wheel 50 to adjust the height of plate 31 relative to the knife edge, the indicating wheel 51 showing the thickness of slice which will be cut by the knife when adjusted. The operator then starts the motor 70 and grasps the handle 29 of the feeding frame with one hand and with the other hand holds the article down on plate 31. The operator then moves the feeding frame towards the knife 19 and over the plate 15, the rapid reciprocation of the knife 19 resulting in cleanly cutting off a slice from the article held in the feeding frame. The thickness of slice is determined by the vertical distance between the plate 31 and the cutting edge, which may be adjusted as above explained. The edge of the knife as it cuts the slice directs it downwardly through the space between the knife edge and the extention 47 of the plate 31, the completed slice dropping onto the base plate 11. By moving the feeding frame back and forth the knife will cut a plurality of slices from the article, the operator taking care to hold the article in contact with plate 31. The knife blade 19 is formed with a plurality of holes 86 to save material, lighten the blade, and serve to clean the guide slot 18 of stray particles of meat or the like.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. A slicing machine comprising an article feeder, a knife element for slicing said article, a driving element connected to the knife element for actuating the same, and means for actuating one of said elements in a direction transverse to a plane which includes the cutting plane of the knife element to effect release of the connection between them.

2. A slicing machine comprising an article feeder, a knife element for slicing said article, a driving element freely engageable and disengageable with the knife for driving the same, and means for disengaging the driving connection between said elements upon movement of one of said elements in a direction transverse to a plane which includes the cutting plane of the knife element.

3. A slicing machine comprising an article feeder, a knife element for slicing said article, a driving element having tooth and slot connection with said knife element for actuating the same, and means for disengaging the teeth from their coacting slots upon changing the position of one of said elements.

4. A slicing machine comprising an article holder, a knife element for slicing the article, slots in one end of said element, a driving member having teeth engaging said slots to drive the knife element, and means for disengaging the teeth from the slots upon lowering said driving element.

5. A slicing machine comprising a gage plate, a knife for slicing an article engaging said plate, a frame, a plurality of members pivoted on said frame, a shaft rotatably journalled in said frame, a plurality of cams fixed to said shaft, each cam engaging an end of one of said members, the other end of a member being pivoted to said plate, and means for rotating said shaft to actuate said members for adjusting the distance between said plate and said knife.

6. In a slicing machine, an article support, a knife for slicing an article on said support, actuating mechanism releasably drivingly connected to said knife, means movable to a certain position for releasing said driving connection, and a removable housing enclosing said mechanism and having means to lock said releasing means against movement when the housing is in place.

7. A slicing machine comprising a gage plate, a knife for slicing an article engaging said plate, a frame, a plurality of members connected to said plate and to said frame, a shaft carried by said frame, and means including a plurality of cam surfaces carried by said shaft, each for engaging one of the said members, and means for rotating said shaft to actuate the members for adjusting the gage plate.

8. A slicing machine comprising an article feeding trough reciprocatably mounted a frame provided with a guide slot having a cross-section wider at the rear than at the forward end, the latter end being open, a knife of similar cross-section to that of the slot seated in said slot and having the knife edge projecting through and past the open forward end of the slot for slicing the article fed thereto by the trough, and means for reciprocating the knife to facilitate the cutting action thereof.

9. A slicing machine comprising a base, a frame mounted thereon, an article feeding trough reciprocably mounted on the frame, a reciprocatable elongated knife guided in said frame and having an end projecting beyond the side of the frame, a motor mounted independently of said frame on the base, a driving element actuated by the motor connected to the projecting end of the knife, a removable housing for the motor, driving element, and projecting end of the knife mounted on the base independently of the frame and motor.

10. In a meat slicing machine, a base, a frame mounted thereon and provided with a slot, an elongated knife movably seated in said slot, and holes formed along the length of the knife to effect cleaning of the walls of the slot during movement of the knife, the scraps of meat or the like being moved into the holes of the knife during movement of the latter.

11. A slicing machine comprising a base, a frame carried thereby, said frame comprising vertical side plates and a top plate rigid with the side plates, an elongated knife horizontally disposed for movement in the forward end of said top plate and having the knife edge projecting beyond the forward end of the top plate and lying in the same general plane as the top plate, means for engaging the knife along its length to prevent movement thereof towards said end of the top plate, a horizontal plate for supporting an article, and means for carrying the article from the supporting plate past the knife edge and onto the top plate to cause the knife to cut a slice from the article.

12. A slicing machine comprising a base, a frame including parallel vertical side plates mounted on the base, guide tracks formed in the plates at their upper ends, an elongated knife horizontally and movably disposed between said plates, means engaging the knife along its length to prevent movement thereof in any direction transverse to its length and an article feeder provided with elements cooperating with the said tracks to guide the feeder towards the knife.

13. A slicing machine comprising a base, a frame including parallel vertical side plates, a top plate fixed to the side plates, a knife horizontally guided in the top plate, means for reciprocating the knife, and a recess formed on the inside of one of the side plates to accommodate the knife when it moves towards the latter plate.

14. A slicing machine comprising a base, a frame including side plates mounted thereon, a knife carried by the frame, a gage plate for supporting an article thereon to be sliced by said knife, a member for adjusting the gage plate, and a hollow formed on the outside of one of said side plates to receive the adjusting member.

15. In a slicing machine, a frame having a substantially flat surface, said frame being provided with guide means at the forward end comprising an elongated guide slot having an irregular cross section to provide longitudinal restraining walls, an elongated knife guided by said slot for linear movement and restrained by engagement along its length with said longitudinal restraining walls of the slot from movement transversely of and out of the slot, the knife being entirely guarded by said frame except for a narrow strip of cutting edge which projects slightly beyond said forward end and which lies in the same general plane as said flat surface, an adjustable gage plate substantially parallel to said flat surface and having one end terminating adjacent the cutting edge of the knife, a device for holding an article resting against said gage plate and feeding said article from the gage plate past the knife to be cut thereby and onto said flat surface, and a motor for reciprocating said knife in the guide means to facilitate cutting of the article thereby.

16. In a slicing machine, a frame having a substantially flat top, said frame being provided with a guide slot at the forward end, a straight elongated knife blade guided in said slot for linear movement and entirely guarded by the said frame except for a narrow strip of cutting edge which projects beyond said forward end, an adjustable gage plate substantially parallel to said flat top and having one end terminating adjacent the cutting edge of the knife, an article holding chute for holding an article resting against the gage plate, means for mounting the chute to traverse the gage plate, knife edge, and flat top, means for manually manipulating the chute for such traverse to cause the knife to cut a slice of even thickness from the article in the chute, and power means for reciprocating the knife to facilitate cutting of the article thereby, said power means and said blade releasably connected to each other substantially in the plane of the blade.

17. A slicing machine comprising a knife, a driven element carried thereby, a cooperating driving element, an eccentric pivot on which the latter element moves during its operation, said pivot being movable eccentrically about its axis to displace the driving element completely out of engagement with the driven element carried by the knife.

18. A slicing machine comprising an article feeder, an elongated knife element for slicing said article, a driving element connected to the knife element for reciprocating the same, and a mounting for one aforesaid element permitting movement thereof in a direction transverse to the plane including the plane of movement of the knife element for actuating one of said elements to effect release of the connection between them.

In testimony whereof I hereto affix my signature.

EUGENE A. FORD.